United States Patent [19]

Mori et al.

[11] 4,268,141
[45] May 19, 1981

[54] PHOTO-DETECTION ADAPTER FOR AN AUTOMATIC FLASH DEVICE

[75] Inventors: Ryutaro Mori, Hirakata; Akira Iwamoto, Osaka, both of Japan

[73] Assignee: West Electric Company, Ltd., Osaka, Japan

[21] Appl. No.: 93,139

[22] Filed: Nov. 9, 1979

[30] Foreign Application Priority Data

Nov. 14, 1978 [JP] Japan ................................. 53-140881

[51] Int. Cl.³ ............................................. G03B 15/05
[52] U.S. Cl. ........................................ 354/35; 354/59; 354/126; 362/4; 362/32
[58] Field of Search ..................................... 354/32–35, 354/62, 59, 79, 126, 145, 295; 362/4, 7–9, 32

[56] References Cited

U.S. PATENT DOCUMENTS

| 3,614,918 | 10/1971 | Hennig | 354/35 |
| 3,798,665 | 3/1974 | Eloranta et al. | 354/79 |
| 3,898,678 | 8/1975 | Walworth | 354/79 |
| 4,023,188 | 5/1977 | Veda et al. | 354/33 |
| 4,107,706 | 8/1978 | Veda et al. | 354/33 X |
| 4,201,934 | 5/1980 | Esaki | 354/35 X |

*Primary Examiner*—L. T. Hix
*Assistant Examiner*—William B. Perkey
*Attorney, Agent, or Firm*—Cushman, Darby & Cushman

[57] ABSTRACT

A photo-detection adapter for an automatic strobe comprising a mounting means attachable to a barrel of a photographic lens, an external photo-detection part supported by the mounting means so as to change a detection direction for properly receiving a reflection light from a photographic object, a light conduction means for conducting the reflection light from the photographic object to a photo-detection element disposed in the strobe, and a coupling means for holding the output end of the light conduction means so as to face to the photo-detection element in the strobe.

12 Claims, 15 Drawing Figures

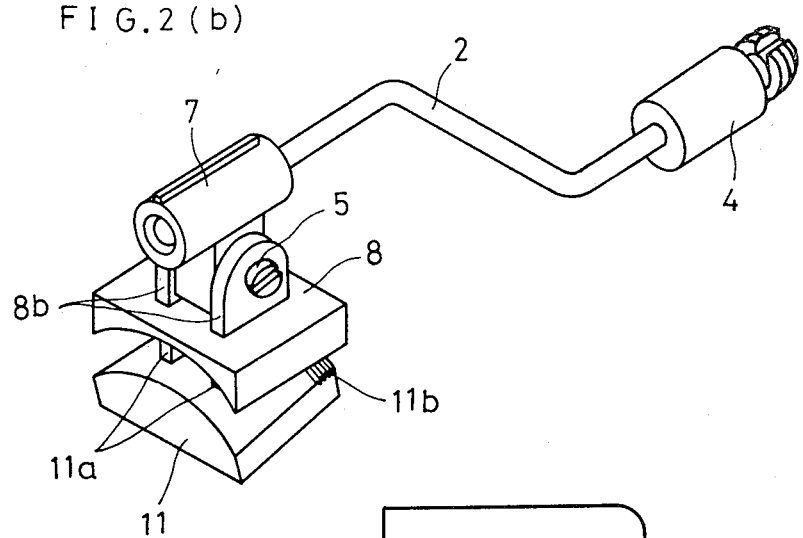
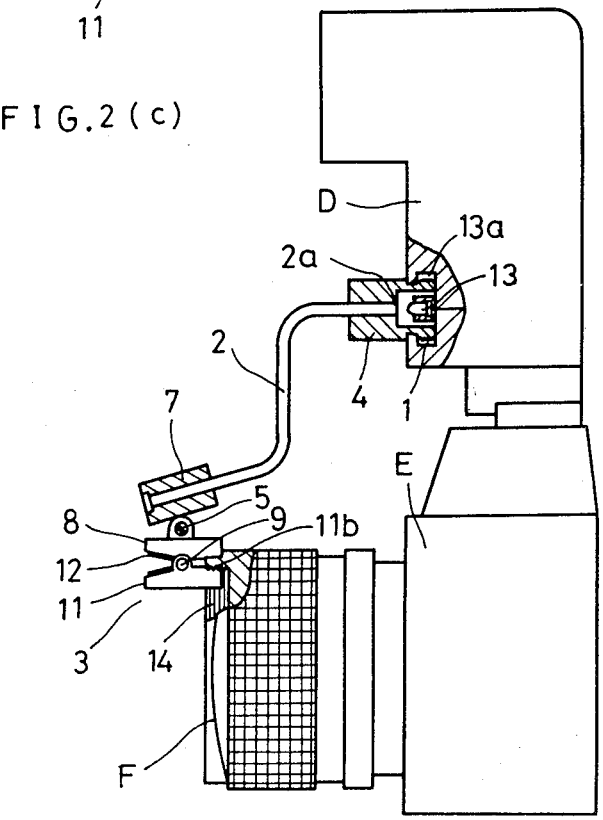

PHOTO-DETECTION ADAPTER FOR AN AUTOMATIC FLASH DEVICE

BACKGROUND OF THE INVENTION

1. Field of the Invention

The present invention relates to a photo-detection adapter for an automatic flash device wherein a flash light amount is controlled in accordance with a reflected light from a photographic object.

2. Prior Arts

A reflector lamp or a strobe has been used as an artificial light source for general photographing, as well as for a close-up photographing. When the close-up photographing is carried out by using a reflector lamp, there arises a problem due to radiation heat from the lamp. In particular, such radiation heat can not be ignored for photographic objects which are sensitive to the heat or are living things.

On the other hand, for the close-up photographing ring flash lamps are known, which are disposed circularly around the photographic lens. But, hitherto such ring flash lamp devices have no automatic control means, by which a radiation light amount is automatically controlled. Therefore, it is necessary to calculate an exposure value when they are used instead of a strobe. The exposure value is liable to be affected largely by a slight photographic distance variation for the close-up photographing, and accordingly it becomes extremely troublesome to obtain a suitable exposure value.

When a usual automatic control strobe is used for the close-up photographing, it is not necessary to calculate the abovementioned exposure value. But there are some other problems. Since a photo-detecting means for receiving a reflection light from a photographic object is normally disposed on the front face of the main body of the strobe, it does not receive a sufficient amount of the reflection light from the photographic object closely facing to the camera, and therefore a correct automatic control operation can not be expected.

In some automatic control strobes, it is possible to mount the photo-detecting means at an appropriate place outside the main body of the strobe by using a connection cord. However, in such a case the photo-detecting means is attached to a mounting shoe of the camera or a bracket for fixing the strobe to the camera body in order to enable the photographer to make a bounce photographing. The photo-detecting means is still far from the photographic object, and therefore it is also impossible to sufficiently receive the reflection light from the photographic object close to the camera in the closeup photographing.

SUMMARY OF THE INVENTION

The present invention provides a photo-detection adapter of an automatic control strobe, the adapter comprising an external photo-detection part, a light conduction means and a connection means.

BRIEF EXPLANATION OF THE DRAWINGS

FIG. 2(b) is a view showing the completed photo-detection adapter of FIG. 2(a).

FIG. 2(c) is a partially sectional view showing the photo-detection adapter of FIG. 2(b) in use.

DESCRIPTION OF THE PREFERRED EMBODIMENTS

The present invention provides a photo-detection adapter for an automatic strobe comprising a light conduction means for conducting a light therethrough, a mounting means attachable to a barrel of a photographic lens, an external photo-detection means in which an input end of said light conduction means is disposed and which is movably supported by said mounting means, said external photo-detection means being for receiving a reflection light from a photographic object at said input end, and a coupling means for holding an output end of said light conduction means in front of a photo detector of an automatic strobe thereby giving an output light conducted through said light conduction means to said photo-detector.

Figure 1:
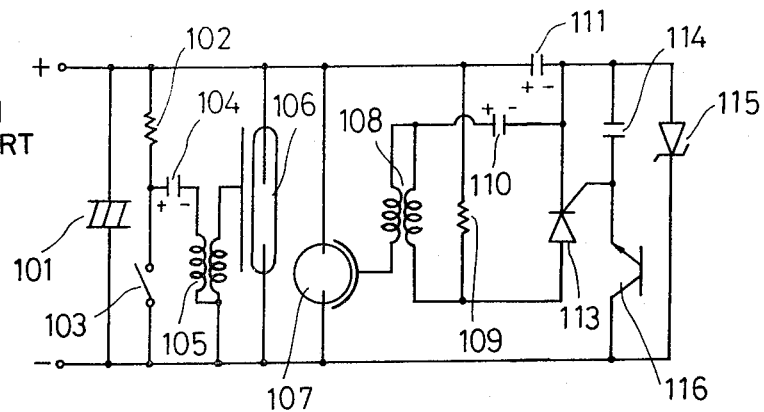
FIG. 1 is a circuit diagram for an automatic strobe.

FIG. 1 shows one example of a known electric circuits used for an automatic strobe. The operation of the electric circuit of FIG. 1 is described in the following. When a main capacitor 101 is charged, trigger capacitors 104 and 110 and a capacitor 111 are also charged. The trigger capacitor 104 is charged through a resistor 102 and a transformer 105. The trigger capacitor 110 is charged through a resistor 109, a transformer 108 and a constant-voltage device 115. The capacitor 111 is charged through the constant-voltage device 115. These capacitors 104, 110 and 111 are charged with polarities as indicated in FIG. 1. When a synchronizing switch 103 is closed, a discharging tube 106 begins to discharge, and at the same time charges on the capacitor 111 discharge through the discharging tube 106 and the constant-voltage device 115. A terminal voltage across the constant-voltage device 115 is impressed across a series element member consisting of an integration capacitor 114 and a photo-detector 116. The photo-detector 116 receives a reflection light from a photographic object, and the integration capacitor 114 is charged in proportion to a received light amount. When a charging voltage value reaches a predetermined value, a thyristor 113 is turned on. Accordingly, charges stored on the trigger capacitor 110 are discharged through a transformer 108 and the thyristor 113 thus turning the discharging tube 107 on and by-passing the charges stored on the main capacitor 101. Therefore, a discharging time of the main capacitor 101 is controlled by the amount of the light reflected from the photographic object.

The electric circuit shown in FIG. 1 is one example of known circuits used for the automatic strobe. The existing automatic strobe always comprises a photo-detector. The photo-detection adapter of the present invention comprises a light conduction means to conduct the reflection light from the photographic object to the photo-detector disposed in the strobe body. Therefore, the photo-detector can receive a sufficient amount of the reflection light from the photographic object, even when a close-up photographing is made.

Figure 2A:
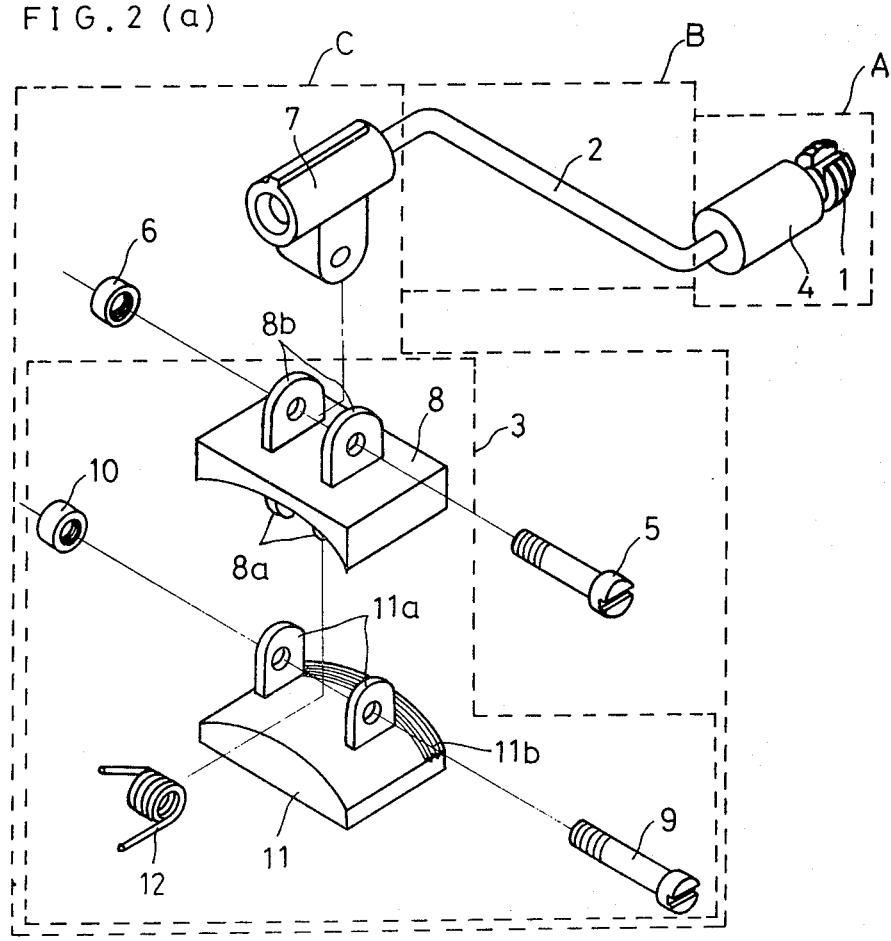
FIG. 2(a) is a view showing a dismantled photo-detection adapter in accordance with a first embodiment of the present invention.

FIG. 2(a) is a dismantled view of a photo-detection adapter in accordance with a first embodiment of the present invention. The photo-detection adapter comprises a coupling part A having a first connecting means 1 to be connected in front of a photo-detector (not shown) in an automatic strobe, a light conduction part B for conduction of a reflection light from a photographic object through a cable 2, in which known glass fiber light waveguides are confined, and an external photo-detection part C having a second connecting part 3 to be mounted to an outer metal body or a barrel of the photographic lens of a camera.

In the first embodiment, the coupling part A is constituted by the first connecting means 1 to be mounted in front of the photo-detector in the strobe, and a connecting body 4 which holds output end terminals of the glass fibers therein and the connecting means 1. The cable 2 filled with glass fibers is used as the light conduction part B to conduct the reflection light received by the external photo-detection part C to the photo-detector in the strobe.

The external photo-detection part C is constituted by the second connecting part 3 and a photo-detection body 7 which holds input end terminals of the glass fibers therein to receive the reflection light thereby. The photo-detection body 7 is movably mounted on the second connecting part 3 by a screw 5 penetrating through holes of the photo-detection body 7 protrusions 8b of a first supporting means 8 and a nut 6. The first supporting means 8 is further movably mounted on a second supporting means 11 by a screw 9 penetrating through holes of protrusions 8a and 11a, a spring 12 in between, and a nut 10. The spring 12 is used to press the first supporting means 8 against the second supporting means 11. Screw threads 11b partly formed on the second supporting means 11 have a pitch same as that of screw threads formed inside the barrel of the photographic lens for attachment of filters or the like.

FIG. 2(b) shows the completed photo-detection adapter of FIG. 2(a). The spring 12 is not shown in FIG. 2(b), but is used for pressing the first supporting means 8 against the second supporting means 11 as shown in FIG. 2(b).

FIG. 2(c) is a partially sectional elevation view showing the photo-detection adapter of FIG. 2(b) in use. A strobe body D, a camera body E and a photographic lens F are also shown in FIG. 2(c). The photo-detector 13 is disposed in the strobe body D. Screw threads 14 are tapped in a barrel of the photographic lens F so that a desired filter is attached thereto by screwing. The first connecting means 1 is inserted in a recess 13a, where the photo-detector 13 is disposed. End faces 2a of the glass fibers namely, output end terminals which are held in the connecting body 4 face to the detection surface of the photo-detector 13. The second connecting part 3 comprising the first supporting means 8 and the second supporting means 11 is mounted on the barrel of the photographic lens F by pinching the brim of the barrel by the first supporting means 8 and the second supporting means 11 in a manner that the screw threads 14 of the barrel and the screw threads 11b on the second supporting means 11 engage with each other by being pressed by the spring 12. Therefore, it is possible to set the photo-detection body 7 extremely close to the optical axis of the photographic lens F. The photo-detection body 7 is rotatably mounted on the first supporting means 8 by the bolt 5 and the nut 6 so that the direction of the photo-detection body 7 can be adjusted most appropriately to receive the reflection light from the photographic object.

The photo-detection adapter in accordance with the present invention enables the photographer to make a close-up photographing with the strobe without carrying out a troublesome calculation for compensation of the exposure value, since the photo-detector disposed in the strobe body can receive a sufficient amount of the reflection light substantially at a place extremely close to the optical axis of the photographic lens.

Figure 3A:
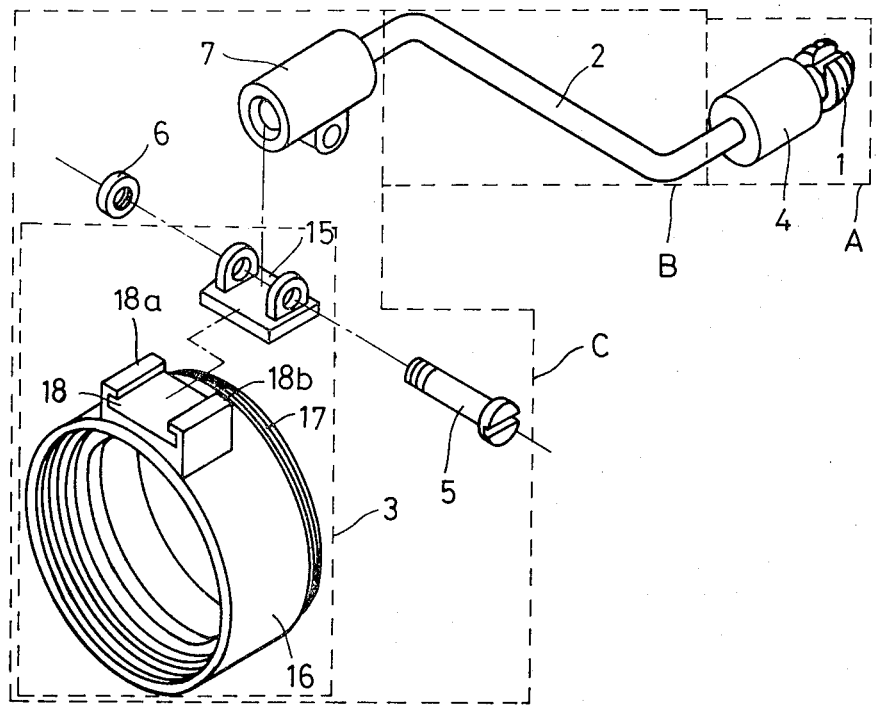
FIG. 3(a) is a view showing a dismantled photo-detection adapter in accordance with a second embodiment of the present invention.

FIG. 3(a) shows a dismantled photo-detection adapter in accordance with a second embodiment of the present invention. Several portions of the photo-detection adapter with the same reference numbers are similar to those described in reference to FIG. 2(a). In this embodiment a supporting ring 16 is used as a second connecting part 3. The supporting ring 16 has screw threads 17 at its rear end part so as to fit the threads formed inside the front part of the barrel of the photographic lens. The supporting ring 16 has a supporting base 18 or a slide-in rail for supporting a supporting base 15. A photo-detection body 7 is movably fixed at the supporting base 15 by a bolt 5 and a nut 6. The supporting base 15 is disposed on the supporting base 18 by slidingly inserting the lower part of the supporting base 15 under protrusions 18a and 18b of the supporting base 18 as shown in FIG. 3(b).

Figure 3B:
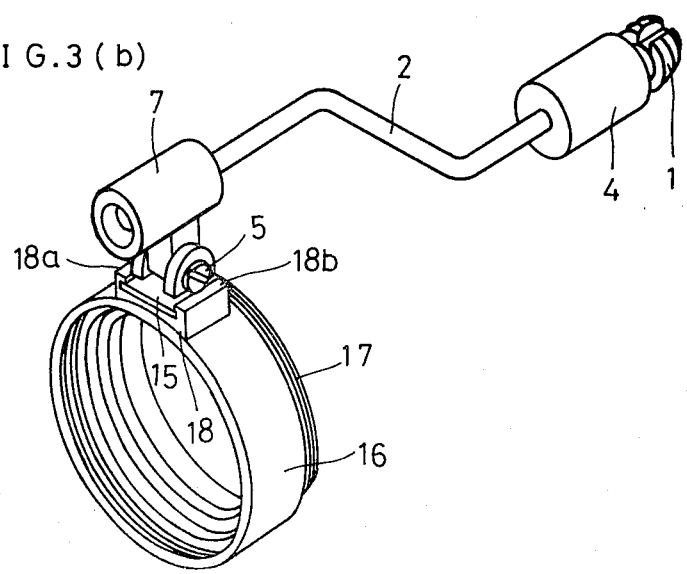
FIG. 3(b) is a view showing the completed photo-detection adapter of FIG. 3(a).
Figure 3C:
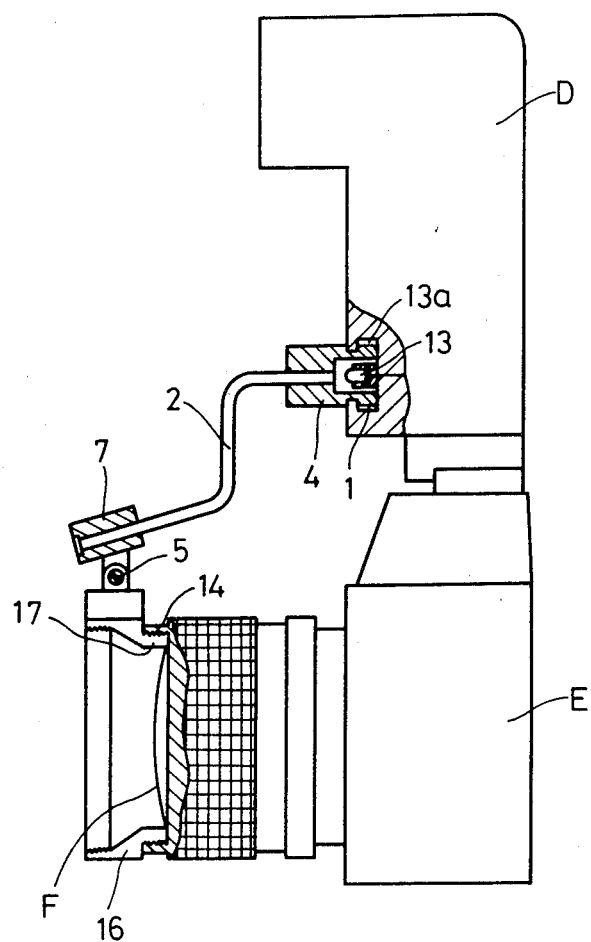
FIG. 3(c) is a partially sectional view showing the photo-detection adapter of FIG. 3(b) in use.

FIG. 3(b) is a view showing the completed photo-detection adapter of FIG. 3(a). A coupling part A and a light conduction part B are similar to those used in the first embodiment. A first connecting means 1 is similarly fitted in a recess 13a formed in a strobe body as shown in FIG. 3(c). A photo-detector 13 is disposed in the recess 13a. A tube 2 filled with glass fibers serves to conduct the reflection light from a photographic object to the photo-detector 13.

FIG. 3(c) is a partially sectional view showing the photo-detection adapter in use. Several portions of the photo-detection adapter with the same reference numbers are similar portions to those described in reference to FIG. 2(c). The first connecting means 1 of the coupling part A is connected by inserting it in the recess 13a formed in the strobe body D in such a manner that the output end faces of the glass fibers closely face to the photo-detector 13. The supporting ring 16 serving as the second connecting part 3 is disposed to fit the barrel at the front part of the photographic lens F by engagement of the screw threads 17 on the supporting ring 16 with the screw threads 14 tapped in the barrel of the photographic lens F. It is similarly possible as in the first embodiment to set the photo-detection body 7 extremely close to and as well as to have various angles against the optical axis of the photographic lens F. Therefore, the photo-detector 13 can receive the reflection light coming from various directions by adjusting the direction of the photo-detection body 7 around the axis of the bolt 5.

Figure 4A:
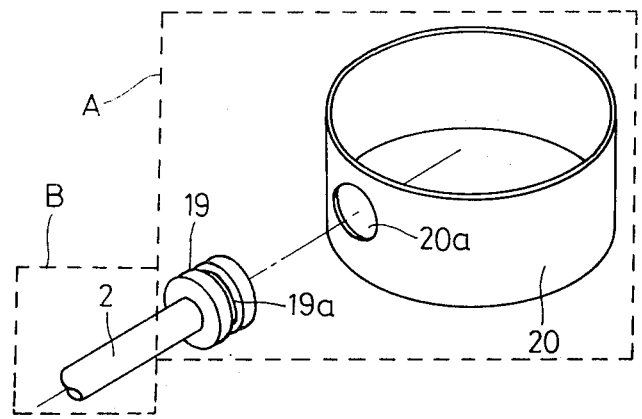
FIG. 4(a) is a view showing a part of a dismantled photo-detection adapter in accordance with a third embodiment of the present invention.
Figure 4B:
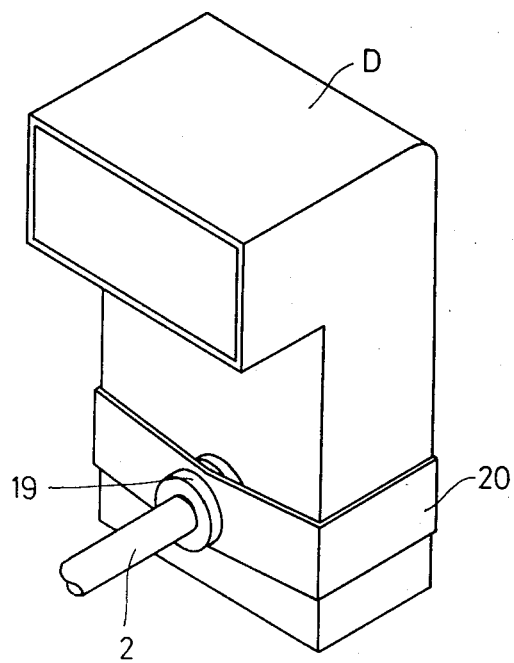
FIG. 4(b) is a view showing the completed photo-detection adapter of FIG. 4(a) in use.

FIG. 4(a) is a view showing a part of a dismantled photo-detection adapter in accordance with a third embodiment of the present invention. A coupling part A and a part of a light conduction part B are shown in FIG. 4(a). An external photo-detection part C is omitted in FIG. 4(a). It is naturally possible to utilize the external photo-detection part C here described in the first and second embodiments. The coupling part A of FIG. 4(a) comprises a third connecting means 19 and a rubber band 20. The third connecting means 19 holds output terminals of glass fibers filled in a tube 2. The rubber band 20 has a hole 20a, to which a groove 19a of the third connecting means 19 is inserted. FIG. 4(b) is a view showing the completed photo-detection adapter of FIG. 4(a) in use. The photo-detection adapter is easily attached in front of a photo detector of the strobe by use of the rubber band 20.

Figure 5A:
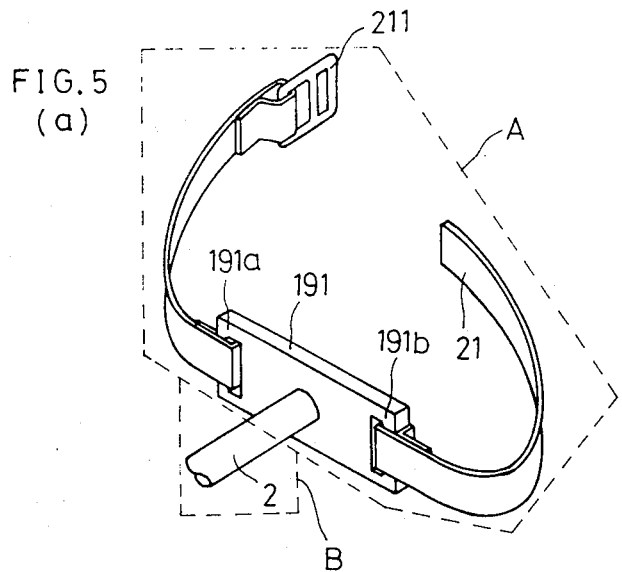
FIG. 5(a) is a view showing a part of a photo-detection adapter in accordance with a fourth embodiment of the present invention.
Figure 5B:
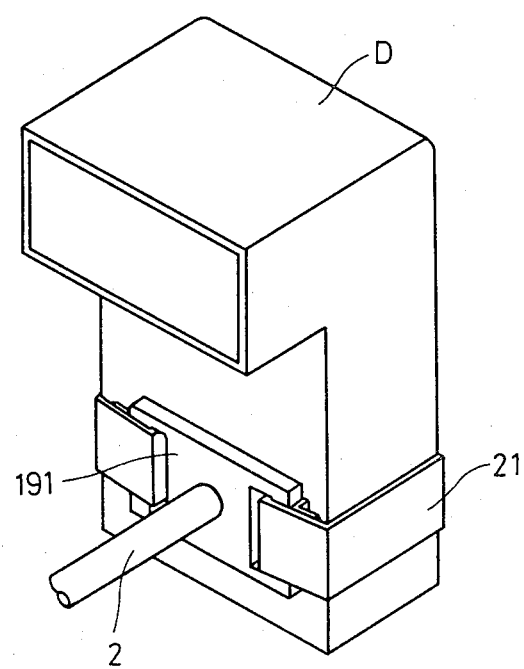
FIG. 5(b) is a view showing the part of the photo-detection adapter of FIG. 5(a) in use.

FIG. 5(a) is a view showing a part of a photo-detection adapter in accordance with a fourth embodiment of the present invention. In this embodiment a non-elastic fixing band 21 and a buckle 211 are used instead of the elastic rubber band 20 of the third embodiment. A fourth connecting means 191 or buckle serves as like the third connecting means 19 of FIG. 4(a), and is supported at end parts 191a and 191b by the fixing band 21. FIG. 5(b) is a view showing the completed photo-detection adapter of FIG. 5(a) in use. The photo-detection adapter is firmly attached in front of a photo detector in a strobe body by using the band 21.

Figure 6A:
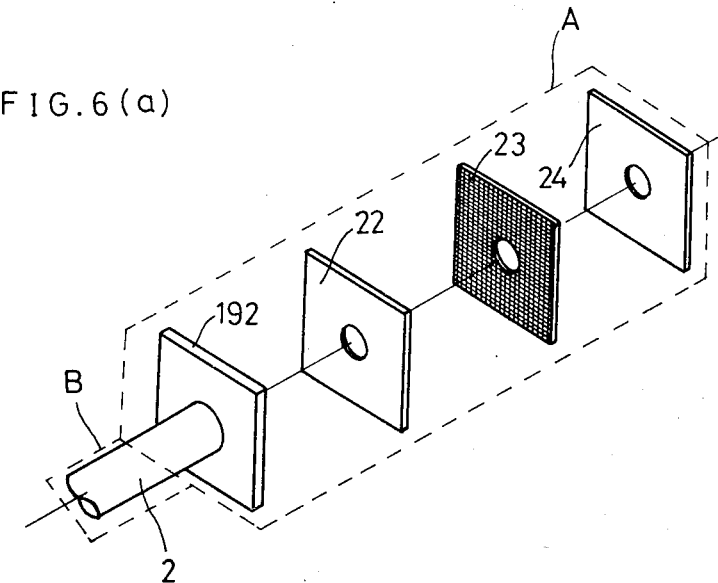
FIG. 6(a) is a view showing a part of a dismantled photo-detection adapter in accordance with a fifth embodiment of the present invention.
Figure 6B:
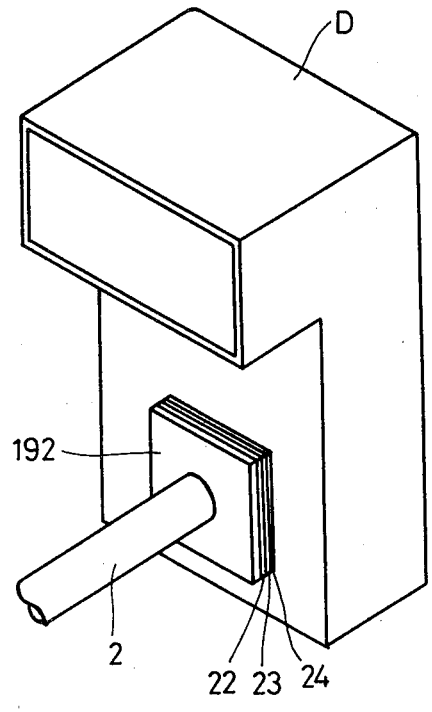
FIG. 6(b) is a view showing the completed photo-detection adapter of FIG. 6(a) in use.

FIG. 6(a) is a view showing a part of dismantled photo-detection adapter in accordance with a fifth embodiment of the present invention. In this embodiment a coupling part A comprises a fifth connecting means 192, plates 22 and 23 with a detachable bonding sheets on their opposing face, the detachable bonding sheet consisting of films with small plastic hooks and loops, and a plate 24 with strong adhesive sheet on the both sides thereof. FIG. 6(b) is a view showing the completed photo-detection adapter of FIG. 6(a) in use. The fifth connecting means and plates 22, 23 and 24 are successively adhered with each other so that output ends of glass fibers in a tube 2 fixed to the fifth connecting means 192 are detachably disposed in front of a photo detector in a strobe body. Since the detachable bonding sheet with plastic hooks and loops has a sufficient strength as the cases of using the rubber band 20 and the fixing band 21, a sufficient bonding force is obtainable in attaching the tube 2 to the strobe. There is no need to worry about the falling off of the fifth connecting means 192, since no strong force is exserted on the fifth connecting means 192 via the tube 2 during the actual use. In addition, it is further possible to detach the fifth connecting means 192 when it is not used. It is naturally possible to suitably employ the external photo-detection part C of the first and second embodiments in the fourth and fifth embodiments. The photo-detection adapter in accordance with the third, fourth and fifth embodiments is advantageous in comparison to the adapter of the first and second embodiments in that there is no need to form the recess 13a in the strobe body for connection with the first connecting means 1. Therefore, the photo-detection adapter is freely applicable to the various kinds of strobes in existence.

Figure 7:
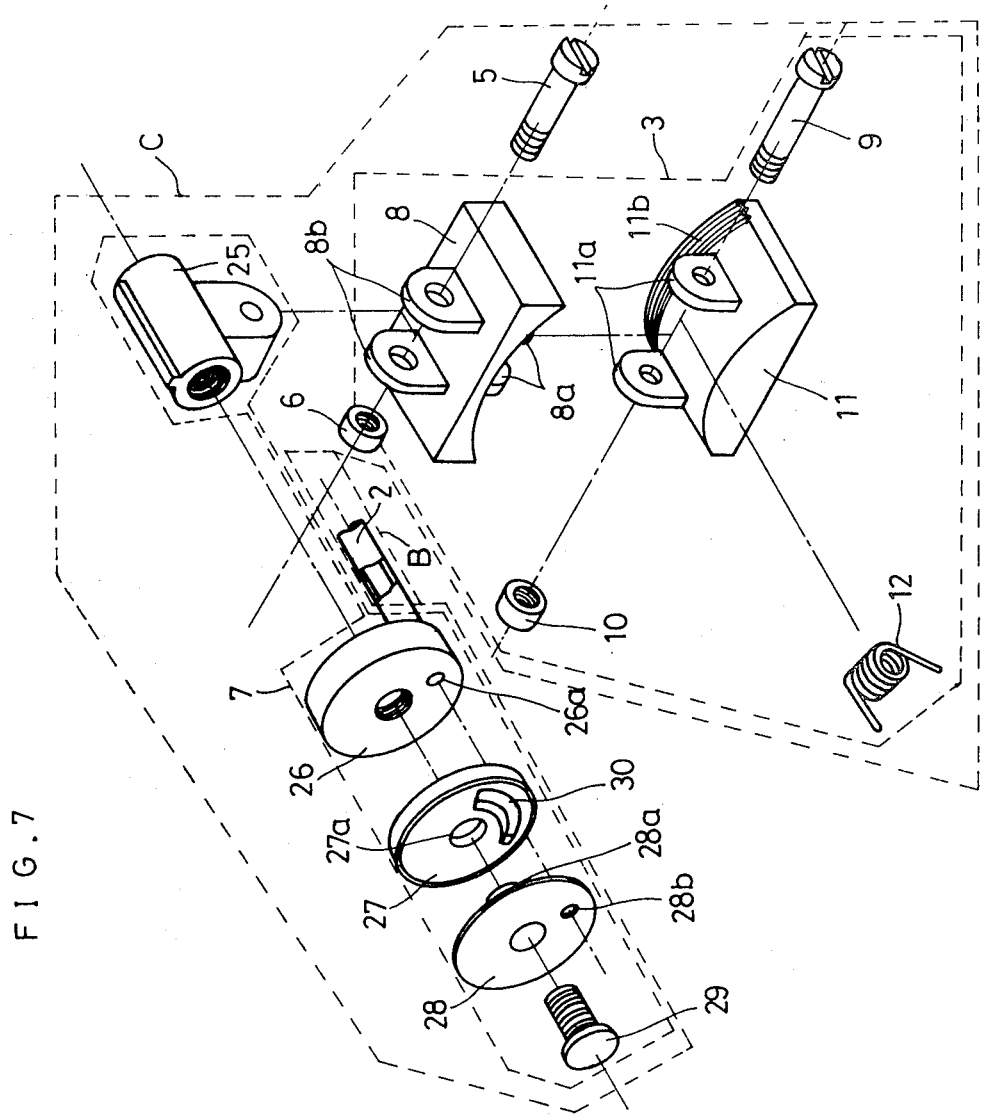
FIG. 7 is a view showing a dismantled photo-detection adapter in accordance with a sixth embodiment of the present invention.
Figure 8:
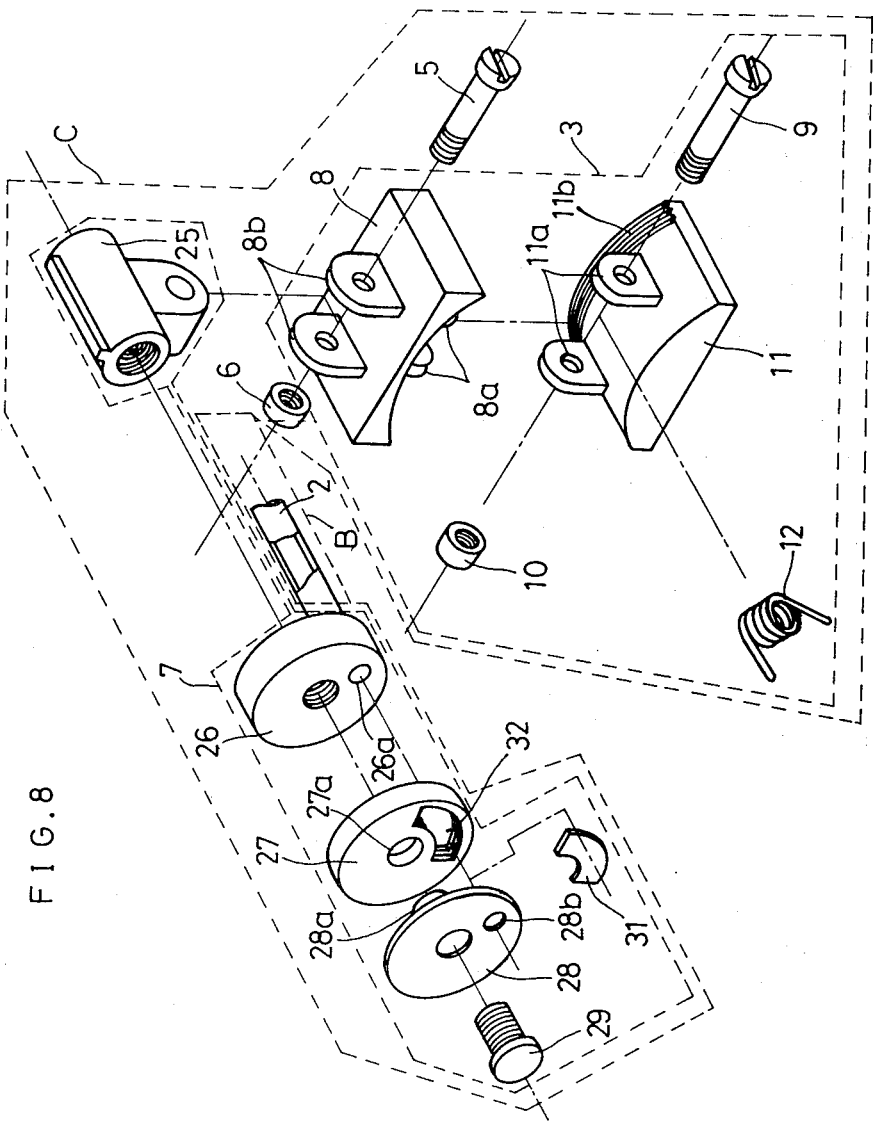
FIG. 8 is a view showing a dismantled photo-detection adapter in accordance with a seventh embodiment of the present invention.

FIG. 7 and FIG. 8 are perspective views showing dismantled photo-detection adapter in accordance with sixth and seventh embodiments of the present invention. In these views a coupling part A is omitted. It is naturally possible to employ the several different coupling parts described so far.

A light conduction part B and an external photo-detection part C are shown in FIG. 7. Several portions with the same reference numbers are similar to those described with reference to FIG. 2(a). A photo-detection body 7 comprises a supporting body 25, a photo-detection main body 26, plates 27 and 28. The supporting body 25 is movably mounted on a first supporting means 8 by a bolt 5 and a nut 6. The photo-detection main body 26 and plates 27 and 28 are fixed by a bolt 29 through holes of the photo-detection main body 26 and plates 27 and 28. The photo-detection main body 26 has an opening 26a on which the reflection light from a photographic object impinges. An input end part of glass fibers in a tube 2 is held at the opening 26a. The plate 27 has a tapered width groove 30 which is used to vary an effective opening area of the opening 26a. A cylindrical protrusion 28a of the plate 28 is formed to loosely fit in an circular opening 27a so that the plate 27 is rotatable around the cylindrical protrusion 28a between the photo-detection main body 26 and the plate 28.

The plate 28 has an opening 28b so that the reflection light from the photographic object can reach the glass fibers in the tube 2 through the opening 28b, the tapered width groove 30 and the opening 26a. Accordingly, it is possible to arbitrarily control the amount of the reflection light impinging on the opening 26a by revolving the plate 27. This means that the photo-detection adapter of FIG. 7 enables the photographer to control the amount of the reflection light impinging on a photo detector disposed in a strobe body.

In FIG. 8 a groove 32 is formed at a plate 27 instead of the groove 30. The groove 32 is used to insert a filter 31 having different light transmittance varying from place to place. Other portions are similar to those of FIG. 7. In this embodiment the amount of the reflection light is varied by the filter 31 by revolving the plate 27, and a similar effect is expected as like the case of FIG. 7.

It is naturally possible to employ other type of the second connecting part 3 such as the ring-shaped connecting part of FIG. 2(a) in the embodiments of FIG. 7 and FIG. 8.

What is claimed is:

1. A photo-detection adapter for a strobe comprising
a light conduction means for conducting light therethrough,
a mounting means attachable to a barrel of a photographic lens,
an external photo-detection means in which an input end of said light conduction means is disposed and which is movably supported by said mounting means, said external photo-detection means being for receiving a reflection light from a photographic object at said input end, and
a coupling means for holding an output end of said light conduction means in front of a photo-detector of an automatic strobe thereby to give output light conducted through said light conduction means to said photo-detector.

2. A photo-detection adapter for a strobe in accordance with claim 1, wherein
said mounting means comprises a first holding means for rotatably holding said external photo-detection means,
a second holding means having a screw thread of a pitch to fit the thread of a barrel of said photographic lens, said second holding means rotatably holding said first holding means, and
a spring for producing a pressing force between said first holding means and said second holding means to pinch said barrel.

3. A photo-detection adapter for a strobe in accordance with claim 1, wherein said mounting means is a ring having a screw thread to fit said thread of said barrel.

4. A photo-detection adapter for a strobe in accordance with claim 1, wherein said coupling means has a connecting means which has a ring of rubber band to be set around said strobe and on which said output end of said light conducting means is disposed in a manner to face said photo-detector.

5. A photo-detection adapter for a strobe in accordance with claim 1, wherein said coupling means has a connecting means which has a fastening band of a non-eleastic material and has a length-adjusting buckle for tightly being set around said strobe and on which said output end of said light conducting means is disposed in a manner to face said photo-detector.

6. A photo-detection adapter for a strobe in accordance with claim 1, wherein said coupling means has a holding plate to hold said output end of said light conduction means and a detachable bonding film detachably to bond said holding plate on a front face of said strobe.

7. A photo-detection adapter for a strobe in accordance with either one of claim 1 to 3, wherein said coupling means comprises a mechanical coupler which has a projection to be inserted in and fit a recess wherein said photo-detector of the automatic strobe is disposed, said output end of said light conduction means being coaxially disposed in said projection.

8. A photo-detection adapter for a strobe in accordance with either one of claims 1 to 6 wherein said light conduction means is a cable comprising a bunch of optical fibers.

9. A photo-detection adapter for a stobe in accordance with claim 7 wherein said light conduction means is a cable comprising a bunch of optical fibers.

10. A photo-detection adapter for a strobe in accordance with either one of claims 1 to 6, which further has an adjustable light stop to adjust an amount of a light to be transmitted from said external photo-detection means to said coupling means.

11. A photo-detection adapter for a strobe in accordance with claim 7, which further has an adjustable light stop to adjust an amount of a light to be transmitted from said external photo-detection means to said coupling means.

12. A photo-detection adapter for a strobe in accordance with claim 8, which further has an adjustable light stop to adjust an amount of a light to be transmitted from said external photo-detection means to said coupling means.

* * * * *